United States Patent Office 3,329,798
Patented July 4, 1967

3,329,798
WELDING FLUX AND METHOD OF WELDING
Wallace C. Johnson, St. Davids, Pa., assignor to Arcos Corporation, Philadelphia, Pa., a corporation of Pennsylvania
No Drawing. Filed Sept. 21, 1964, Ser. No. 398,054
8 Claims. (Cl. 219—137)

The present invention relates to improved welding fluxes and to methods of welding.

A purpose of the invention is to produce a flux of lower cost which can be utilized for welding mild steel, either manually, semi-automatically or automatically, including welding at high input, of the order of 1,000 amperes or greater.

A further purpose is to avoid the necessity of a high temperature baking of the character which has been necessary in previous prebonded fluxes.

A further purpose is to prevent segregation of welding flux during shipment and to avoid the necessity of homogenizing welding flux at the point of use.

A further purpose is to produce a welding flux of particles of different compositions, the particles being of nearly the same particle size and of the same bulk density.

A further purpose is to avoid the necessity of prefusing welding flux or of agglomerating or prebonding welding flux.

A further purpose is to avoid the need for using binder in welding flux.

A further purpose is to provide an improved self-removing welding flux.

A further purpose is to produce a welding flux of low moisture pickup so that baking immediately prior to use can be avoided.

A further purpose is to make it possible to utilize metals such as deoxidizers in a welding flux consisting of loose particles by making up synthetic particles of different compositions which have the same bulk density and the same particle size.

Further purposes appear in the specification and in the claims.

In the prior art the present practice is to prefuse welding fluxes or to preagglomerate or bond welding fluxes. Both of these processes, however, add considerably to the cost.

I have discovered that a very desirable welding flux for alloy steel or mild steel welding can be made without the necessity of prefusing or preagglomerating or bonding. This flux has the advantage of being of very low cost.

The welding flux of the invention is usable for various welding applications in which a granular flux will be employed, including submerged arc welding, and also welding in protective gaseous atmosphere such as carbon dioxide, argon, helium, or a mixture of any of them, in which granular flux is supplied at the weld, either as the sole flux or to supplement flux supplied by a flux-cored electrode.

One of the difficulties encountered in the prior art fluxes has been the tendency to segregate or separate in shipment. I find that the flux of the present invention can be shipped by any normal transportation means and will remain homogeneous.

In some fluxes, the presence of a binder such as sodium silicate is undesirable and one advantage of the present invention is that sodium silicate need not be used except in special cases.

The flux of the invention also is advantageous because the slag formed is self-removing and thus avoids the necessity of chipping or pounding. The flux of the present invention is low in moisture content and so does not require baking either during manufacture of the flux itself or at the point of use immediately before using.

Desirable weld properties can be obtained with the flux of the invention.

Where it is necessary to combine metals in the flux of the invention, I find that synthetic flux particles can be made by bonding together a metal of relatively higher density and a mineral of relatively lower density, and incorporating this in a flux having particles of different compositions which are similarly compounded of the same bulk density.

In the preferred flux composition of the invention the major compound is an alumina-silica mineral, preferably kyanite, but permissibly another alumina-silica mineral such as andalusite or nepheline syenite.

While raw kyanite or other alumina-silica mineral can be used without preparation, it is preferably roasted at a temperature of above 1100° F. to remove sulphur and to convert ferric oxide present as an impurity into magnetic iron oxide. The product is then run through a magnetic separator which removes the particles which contain magnetic iron oxide.

The kyanite along with the other products in the flux are crushed and ground to pass through 35 mesh per linear inch in a preferred embodiment.

Where reference is made to flux through 35 mesh or the like, it will be evident that it is not desirable to employ a flux which is all or almost all fine particles. When flux is referred to as 35 mesh or the like, it is intended to indicate that a major quantity, more than 75%, will be retained on a 100 mesh screen.

The kyanite which I have used has a bulk density of 29.6 grams per cubic inch.

As a minor ingredient in the flux I use fluorspar also through 35 mesh per linear inch. The fluorspar has a bulk density of 27.2 grams per cubic inch.

I also desirably use limestone in the preferred flux, through 35 mesh per linear inch. The limestone has a bulk density of 23.4 grams per cubic inch.

In the preferred flux of the invention I utilize the following composition by weight:

| | Percent |
|---|---|
| Kyanite or other alumina-silica mineral | 50 to 88 |
| Fluorspar | 4 to 30 |
| Limestone | 5 to 10 |

In some cases to increase the fluidity of the flux I use a composition by weight as follows:

| | Percent |
|---|---|
| Kyanite | 50 to 88 |
| Fluorspar | 4 to 30 |
| Limestone | 5 to 10 |
| Ground silica-lime glass | 5 to 10 |

EXAMPLE 1

In this case a flux having the following composition by weight is made up, all being particles through 35 mesh per linear inch:

| | Percent |
|---|---|
| Kyanite | 84 |
| Fluorspar | 8 |
| Limestone | 8 |

The flux was dry mixed for five minutes. The flux is used in automatic welding of mild steel preferably with an electrode containing 1 to 1.5% of manganese for deoxidation purposes. Welds were made at 600 amperes DC reverse polarity constant current at 30 volts with a speed of progression of 10″ per minute under the submerged-arc plate-welding technique. The arc action was good; the bead shape was good with a smooth flat surface; the flux was self-removing. The flux produced good welds and it has the advantage that the slag produced is self-removing. When a weld bead reaches a length of about 15″ the slag at the cool end rises about an inch. This saves considerable labor.

EXAMPLE 2

The process of Example 1 was carried out except that the flux had the following composition by weight:

| | Percent |
|---|---|
| Kyanite | 79 |
| Fluorspar | 8 |
| Limestone | 8 |
| Ground soda-lime glass | 5 |

The results were similar to that of Example 1 except that the molten flux was somewhat more fluid.

EXAMPLE 3

The procedure of Example 1 was followed except the flux composition was as follows:

| | Percent |
|---|---|
| Kyanite | 62 |
| Fluorspar | 30 |
| Limestone | 8 |

This gave good arc action and produced sound welds following the procedure of Example 1.

EXAMPLE 4

A two pound sample of the blended flux of Example 1 was placed in a vibrating machine for 20 minutes under intense vibration. There was no tendency to segregate.

It appears from my observations that in order to avoid segregation during shipment it is necessary that the flux particles be of the same bulk density and also of the same particle size. In order to be of the same bulk density or close enough to avoid segregation, I find that the average bulk density of the particles should be taken and that the deviation from this average plus or minus by the various particles in the composition should not be more than 25% and preferably not more than 20%.

I have run experiments with materials of practically the same bulk density such as fluorspar and kyanite, of markedly different mesh size. This is not adequate. After 15 minutes of vibration the material of finer mesh segregated from the material of coarser mesh.

I have also run experiments with materials that were of the same particle size but different bulk density. For example, aluminum oxide having a bulk density of 15.1 grams per cubic inch was mixed with zirconium sand having a bulk density of 43.8 grams per cubic inch, both materials being of the same particle size. These separated into different layers on vibration.

It, therefore, is my conclusion that in order to avoid segregation the particles of different compositions must be of the same bulk density and of the same particle size.

In some cases it is necessary to introduce metals such as ferrochrome, ferrosilicon, ferromanganese, chromium, aluminum, molybdenum, nickel, or the like in the flux. In order to do this and prevent difficulties with segregation I find that synthetic particles composed of minerals and metals can be made which are of the same bulk density and the same particle size. For example, one particle can be of ferrochrome and kyanite, another particle can be of ferromanganese and cryolite, and a third particle can be of ferrochrome and limestone. Or different synthetic particles can be made, some of ferromanganese and kyanite, others of ferromanganese and fluorspar and others of ferromanganese and limestone. If the synthetic particles are thus all of the same bulk density and the same particle size, satisfactory results are obtained.

EXAMPLE 5

A mixture was made of the following particles in the following proportions by weight:

| | Percent |
|---|---|
| Limestone through 100 mesh | 62 |
| Manganese metal through 100 mesh | 36 |
| Bentonite clay through 100 mesh | 2 |

The mixture was bonded by adding 25% on the weight of the dry ingredients of N brand sodium silicate of a concentration of 41° Baumé. N brand sodium silicate has a ratio of $Na_2O$ to $SiO_2$ by weight of 1 to 3.22.

The mixture was homogenized in a blending or mixing device, such as a Baker-Perkins mixer or a Paterson-Kelley mixer, the extent of mixing being controlled until the resulting particles were through 35 mesh and on 100 mesh. The mixture of synthetic particles was then baked at 840° F. until moisture ceased to come off.

The resulting synthetic particles consisting of limestone and managanese were then dry-mixed with particles in each case through 35 mesh and on 100 mesh which had the same density.

The following proportions by weight were used.

| | Percent |
|---|---|
| Synthetic particles of limestone and manganese | 10 |
| Fluorspar | 8 |
| Granular glass powder | 10 |
| Kyanite | 72 |

The flux was used to conduct submerged arc welding under usual conditions, under a current of 400 to 650 amperes at a voltage from 25 to 35 volts, direct current, reverse polarity, at a rate of progression in the range of 4 to 12 inches per minute and gave good results. A low carbon, plain carbon steel continuous electrode was used. All of the particles of the final flux are of the same bulk density and of the same particle size and they remain uniformly distributed without segregation during storage and shipment.

EXAMPLE 6

According to this example, synthetic particles A, B and C were made up using sodium silicate as in Example 5 as a binder and following the procedure of Example 5. The composition by weight of the synthetic particles were as follows:

*Synthetic particles A*

| | Percent |
|---|---|
| Kyanite through 100 mesh | 50 |
| Ferrochrome through 100 mesh | 28 |
| Bentonite through 100 mesh | 2 |
| Sodium silicate, 41° Baumé | 20 |

*Synthetic particles B*

| | Percent |
|---|---|
| Fluorspar particles through 100 mesh | 50 |
| Ferrosilicon particles through 100 mesh | 28 |
| Bentonite particles through 100 mesh | 2 |
| Sodium silicate, 41° Baumé | 20 |

*Synthetic particles C*

| | Percent |
|---|---|
| Limestone particles through 100 mesh | 50 |
| Ferromanganese through 100 mesh | 28 |
| Bentonite through 100 mesh | 2 |
| Sodium silicate, 41° Baumé | 20 |

Each of these mixtures is mixed until the particles are through 35 mesh and on 100 mesh and then is baked at 840° F. until the moisture has been removed.

A welding flux is made up as follows by weight:

| | Percent |
|---|---|
| Synthetic particles A | 12 |
| Synthetic particles B | 8 |
| Synthetic particles C | 10 |
| Kyanite particles through 35 mesh and on 100 mesh | 60 |
| Glass granules through 35 mesh and on 100 mesh | 10 |

The ingredients are dry-mixed together and it is found that they are of the same bulk density and the same particle size and do not segregate. Satisfactory submerged arc welds in steel are made under this flux.

In view of my invention and disclosure, variations and modifications to meet individual whim or particular need will doubtless become evident to others skilled in the art, to obtain all or part of the benefits of my invention without copying the method and composition shown, and I, therefore, claim all such insofar as they fall within the reasonable spirit and scope of my claims.

In view of my invention and disclosure, what I claim as new and desire to secure by Letters Patent is:

1. A welding flux for submerged arc and protective gas electric arc welding essentially consisting of a plurality of separate particles of different compositions, and particles being of the same particle size and the same bulk density.

2. A welding flux for submerged arc and protective gas electric arc welding essentially consisting of separate particles of the following in the following composition by weight:

| | Percent |
|---|---|
| Alumina silica mineral | 50 to 88 |
| Fluorspar | 4 to 30 |
| Limestone | 5 to 10 | of the same particle size.

3. A welding flux for submerged arc and protective gas electric arc welding essentially consisting of separate particles of the following in the following composition by weight:

| | Percent |
|---|---|
| Kyanite | 50 to 88 |
| Fluorspar | 4 to 30 |
| Limestone | 5 to 10 |
| Ground glass | 5 to 10 | of the same particle size.

4. A welding flux for submerged arc and protective gas electric arc welding essentially consisting of separate particles of the following in the following composition by weight:

| | Percent |
|---|---|
| Kyanite | 84 |
| Fluorspar | 8 |
| Limestone | 8 | of the same particle size.

5. A welding flux for submerged arc and protective gas electric arc welding essentially consisting of a plurality of separate macro particles of the same particle size and the same bulk density, said macro particles being composed at least in part of metal particles and mineral particles, the mineral particles being of lower density than the metal particles, and said macro particles being of different compositions.

6. A method of submerged arc and protective gas electric arc welding, which comprises maintaining an arc between an electrode and the work thus producing a weld pool, and protecting the weld pool by a flux which melts to form a slag, said flux essentially consisting of a plurality of separate particles of different compositions, said particles being of the same particle size and the same bulk density.

7. A method of claim 6, in which said flux has the following composition by weight:

| | Percent |
|---|---|
| Alumina silica mineral | 50 to 88 |
| Fluorspar | 4 to 30 |
| Limestone | 5 to 10 |

8. A method of claim 6, in which said flux is composed at least in part of particles which are made up of a combination of metal and of mineral of lower density than the metal.

References Cited

UNITED STATES PATENTS

| 2,701,779 | 2/1955 | Conn | 148—26 X |
| 3,152,019 | 10/1964 | Shrubsall | 219—73 X |
| 3,185,599 | 5/1965 | Stuttgart | 148—26 |

JOSEPH V. TRUHE, *Primary Examiner.*